(12) United States Patent
Sharma et al.

(10) Patent No.: US 8,533,214 B2
(45) Date of Patent: Sep. 10, 2013

(54) SYSTEM AND METHOD FOR ASSESSING QUALITY OF ADDRESS INFORMATION FOR PHYSICAL LOCATIONS

(75) Inventors: Nityanand Sharma, Tampa, FL (US); Sutap Chatterjee, Tampa, FL (US); James M. Wiley, Bluefield, WV (US); Nitesh Malviya, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 493 days.

(21) Appl. No.: 12/816,109

(22) Filed: Jun. 15, 2010

(65) Prior Publication Data
US 2011/0307476 A1  Dec. 15, 2011

(51) Int. Cl.
*G06F 17/30* (2006.01)

(52) U.S. Cl.
USPC ........... 707/763; 707/769; 711/118; 701/409; 701/446

(58) Field of Classification Search
USPC ............... 707/763, 769; 358/1.16; 711/118; 701/409, 446
See application file for complete search history.

(56) References Cited

U.S. PATENT DOCUMENTS

| | | | | |
|---|---|---|---|---|
| 4,989,151 A * | 1/1991 | Nuimura | ........................ | 701/446 |
| 5,381,338 A * | 1/1995 | Wysocki et al. | .............. | 701/409 |
| 5,470,233 A * | 11/1995 | Fruchterman et al. | ......... | 434/112 |
| 5,687,384 A * | 11/1997 | Nagase | .............................. | 704/9 |
| 5,796,634 A * | 8/1998 | Craport et al. | ................ | 702/150 |
| 5,835,690 A * | 11/1998 | Duniho | ........................ | 358/1.16 |
| 5,862,309 A * | 1/1999 | Duniho | ........................ | 358/1.16 |
| 6,016,393 A * | 1/2000 | White et al. | .................. | 719/315 |
| 6,101,496 A * | 8/2000 | Esposito | ....................... | 701/532 |
| 6,292,743 B1 * | 9/2001 | Pu et al. | .......................... | 701/423 |
| 6,363,411 B1 * | 3/2002 | Dugan et al. | .................. | 709/202 |
| 6,373,817 B1 * | 4/2002 | Kung et al. | .................... | 370/217 |
| 6,552,670 B2 * | 4/2003 | Sundaravel et al. | .............. | 341/5 |
| 6,604,046 B1 * | 8/2003 | Van Watermulen et al. | .. | 701/533 |
| 7,039,640 B2 * | 5/2006 | Miller et al. | ........................... | 1/1 |
| 7,792,814 B2 * | 9/2010 | Cohen | ........................... | 707/707 |
| 7,818,333 B2 * | 10/2010 | Biard et al. | .................... | 707/763 |
| 2002/0000999 A1 * | 1/2002 | McCarty et al. | .............. | 345/764 |
| 2008/0162513 A1 * | 7/2008 | Biard et al. | .................... | 707/100 |
| 2009/0182754 A1 * | 7/2009 | Lee et al. | ....................... | 707/100 |
| 2011/0087695 A1 * | 4/2011 | Sharma et al. | ................ | 707/769 |
| 2011/0087839 A1 * | 4/2011 | Sharma et al. | ................ | 711/118 |
| 2011/0098917 A1 * | 4/2011 | LeBeau et al. | ................ | 701/201 |

\* cited by examiner

*Primary Examiner* — Frantz Coby

(57) ABSTRACT

An approach is provided for providing a user with a ranked list of possible physical addresses in response to an address submitted by the user. An address submitted by a user is parsed and a number of possible candidate addresses are generated from the user provided address. The quality of the candidate addresses is ranked according to the quality of their individual address elements and factors applied to these elements. An overall quality score for each candidate address is thereby derived. The list of candidate address is displayed to the user according to overall quality score ranking.

18 Claims, 14 Drawing Sheets

| Address Element | Attribute | Weight |
|---|---|---|
| Street Name | Street Name String ($S_1$) | 1.00 |
| City Name | City Name String ($S_2$) | 0.50 |
| Street Prefix | Street Prefix String ($S_3$) | 0.25 |
| Street Type | Street Type String ($S_4$) | 0.75 |
| Street Suffix | Street Suffix String ($S_5$) | 0.25 |
| Raw String | Raw String ($S_6$) | 1.00 |
| Street Name | Street Name Position ($P_1$) | 1.00 |
| City Name | City Name Position ($P_2$) | 0.50 |
| House Number | House Number Position ($P_3$) | 0.75 |

FIG. 5

SYSTEM AND METHOD FOR ASSESSING QUALITY OF ADDRESS INFORMATION FOR PHYSICAL LOCATIONS

BACKGROUND INFORMATION

As part of common business as well as personal practices, individuals must provide a mailing address in connection with performing a transaction; for example, transactions that occur through the medium of a digital system are prevalent, ranging from electronic commerce to location-based services (e.g., Global Positioning Systems). Typically, an end user provides address information through a keyboard, voice recognition software or other means for capturing information in digital form. However, these mechanisms, as well as others, vary significantly in terms of accuracy and robustness (i.e., the ability to tolerate or accept typographical errors or outright incorrect data).

Therefore, there is a need for an approach that provides effective and convenient techniques for processing addressing information.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a table that shows address elements, address element attribute and weights that are assigned to attributes in connection with generating an overall quality score, according to one embodiment;

DESCRIPTION OF THE PREFERRED EMBODIMENT

A preferred apparatus, method, and software for assessing address information of a physical location are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to assessing a text string specifying address information for a physical location, it is contemplated that these embodiments have applicability to any type of information that is derived to assist with determination of accurate data.

Figure 1:
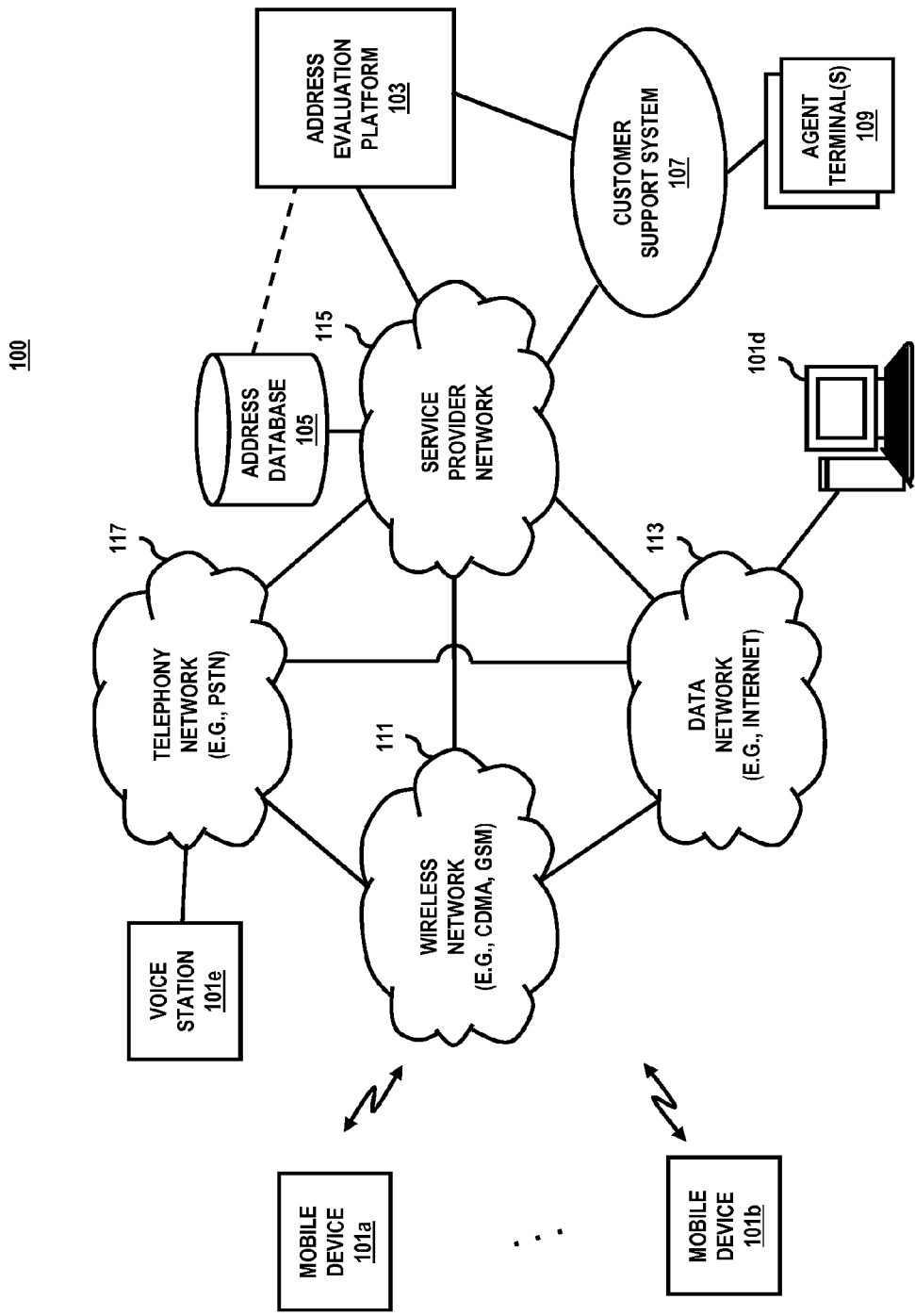
FIG. 1 is a diagram of a system capable of assessing quality of address information associated with a physical location, according to various embodiments.

FIG. 1 is a diagram of a system capable of providing an end user with a ranked listing of possible physical addresses based on user input, according to various embodiments. For illustrative purposes, system 100 is described with respect to a service provider supplying one or more communication services, including a wireless communication service, in which the quality of address information associated with a physical location (e.g., mailing address) can be determined using a scoring approach to rank possible address candidates. It is recognized that some digital systems require a user to enter address information in specified fields. In certain cases, this separate field approach is not convenient for the end user in that entry of the requirement information in such format may be inefficient, slow, or confusing, so other systems allow end users to enter an entire address in a single field. Although such free form entry of information is more flexible and convenient for the user, greater processing is generally required. In these types of systems, the user entered address must be parsed into separate address elements (e.g., house number, street name). For a number of reasons, including typographical errors and ambiguity of address element names and relative location within an address string, the parsing operation may be difficult to perform (if even possible). The address entered by the user may not uniquely identify an actual address. This ambiguity creates issues in terms of accuracy and efficiency for both the end user and the digital system.

To address these issues, an approach for determining the quality of address information associated with a physical location that is provided. In certain embodiments, the approach provides users of mobile devices 101a and 101b with a ranked list of candidate addresses based on a user input address. Using the mobile device 101a, the user can obtain a list of candidate addresses from an address evaluation platform 103. Other user devices, computer 101d and voice station 101e, can also be employed if they are equipped with an input mechanism and user interface to process address information supplied by the respective users.

Address evaluation platform 103 permits users to enter address information in a free flow text, which is parsed to derive possible address options for matching with one or more address entries within an address database 105. Under this scenario, the quality of the address is implemented as a service managed by a service provider. This address evaluation capability can thus be applied to a customer support system 107 in a manner that allows customers to conveniently and accurately convey address information to customer service agents. The agents can readily obtain accurate addresses via their terminal(s) 109. Such implementation is further described with respect to FIG. 13.

In certain embodiments, address evaluation platform 103 generates candidate addresses from the address information supplied by the user. These candidate addresses stem from their "closeness" or degree of match to true or actual addresses within address database 105. These candidate addresses are then ranked based on their quality scores.

In system 100, according to certain embodiments, one or more networks, such as wireless network 111, data network 113, service provider network 115, and/or telephony network 117, are provided to handle various communication sessions, such as voice communications as well as non-voice communications. Networks 111, 113, 115 and 117 may be any suitable wireline and/or wireless network, and be managed by one or more service providers. For example, telephony network 117 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111, 113, 115 and 117 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications.

According to exemplary embodiments, end user devices 101 may include any customer premise equipment (CPE) capable of sending and/or receiving information over one or more of networks 111, 113, 115 and 117. For instance, voice station 101e may be any suitable plain old telephone service (POTS) device, facsimile machine, etc., whereas mobile devices (or terminal) 101a or 101b may be any cellular phone, radiophone, satellite phone, smart phone, wireless phone, or any other suitable mobile device, such as a personal digital assistant (PDA), pocket personal computer, tablet, customized hardware, etc. Further, computing device 101d may be any suitable computing device, such as a VoIP phone, skinny client control protocol (SCCP) phone, session initiation protocol (SIP) phone, IP phone, personal computer, softphone, workstation, terminal, server, etc.

In one embodiment, this process can be executed via an application via the service provider network 115, wherein the user input address is provided to the address evaluation platform 103 through the service provider network 115. In turn, a list of ranked candidate addresses is generated by the address evaluation platform 103 and sent to the mobile device 101a through the service provider network 115 and the wireless network 111.

A customer support system 107 enables customer service agents to interact with end users through the service provider network 115. The customer service agents can provide raw address information from the end user to the address evaluation platform 103 and receive a list of ranked candidate addresses from the address evaluation platform 103. The end user can select one of the candidate addresses with or without the assistance of the customer service agents. The details of how customer support services are enhanced by the address evaluation mechanism are provided with respect to system of FIG. 13.

Figure 2:
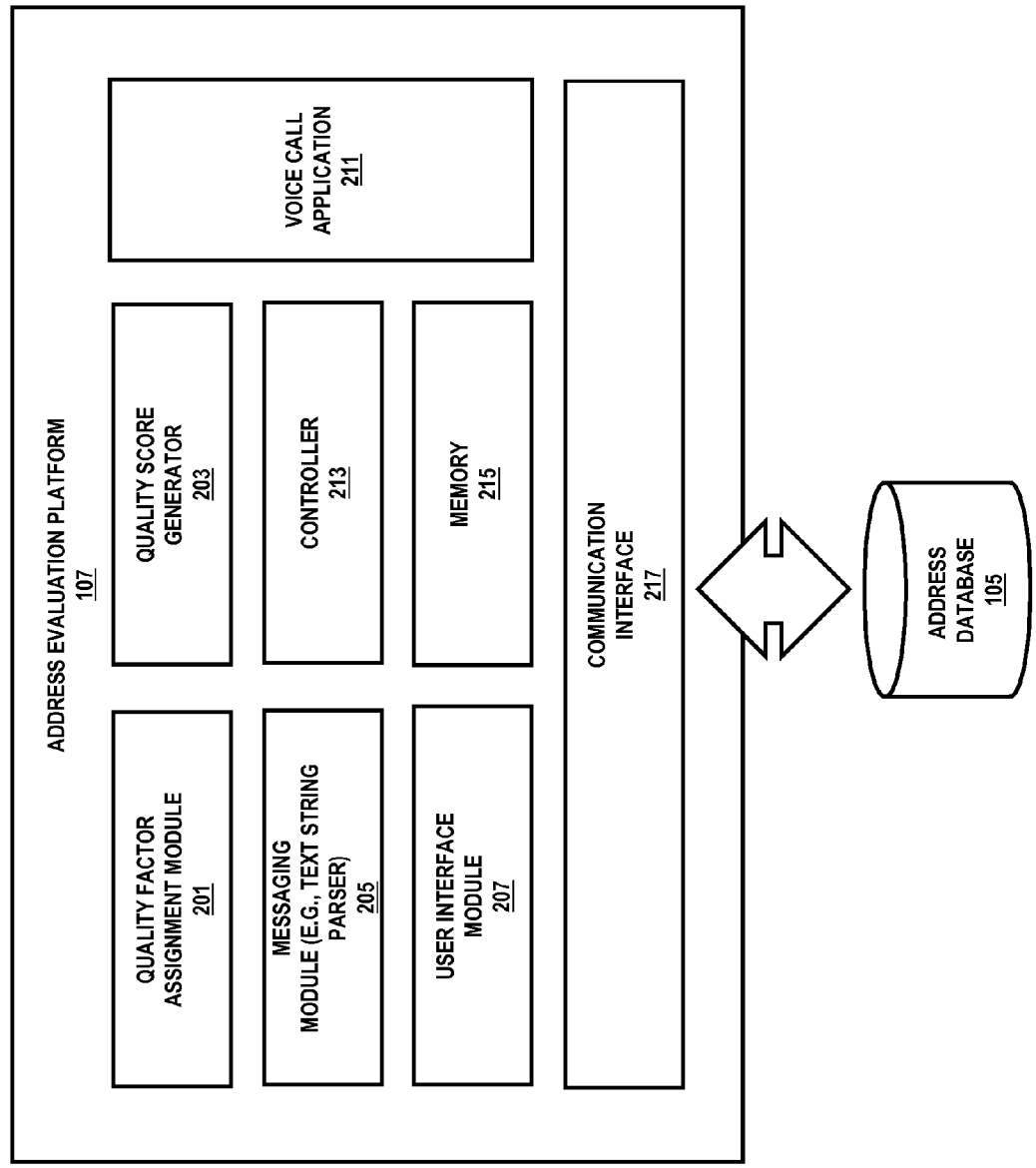
FIG. 2 is a diagram of an address evaluation platform, according to an exemplary embodiment.

FIG. 2 is a diagram of a system capable of the address evaluation platform 103, according to an exemplary embodiment. By way of example, address evaluation platform 103 includes various components: a quality factor (or weight) assignment module 201, a quality score generator 203, a messaging module 205, a user interface module 207, and a voice call application 211 that perform functions under the control of a controller 213. Voice call application 211, for instance, can support inputting of address information aurally (via microphone (not shown)) in addition to or in lieu of input from a keypad, or the like. The controller 213 controls the sequencing of the functions performed by these modules, as well as the interaction of these modules with a memory 215, that stores user input address information, candidate addresses, and other information to support the application 211 and modules 201-207.

The controller 213 also coordinates the retrieval of candidate addresses from the address database 105 through a communication interface 217.

The user interface module 207 receives raw address information from an end user through the service provider network 115 and/or the customer support system 107 (FIG. 1). The user interface module 207 also provides a list of ranked candidate addresses to the end user, as well as possible intermediary information or requests. For example, if the format of the originally input address is not valid, the user interface module 207 may request the user to re-enter the address.

The user interface module 207 provides a user input address to the messaging module 205, which parses the raw address into separate address elements (e.g. "Street Number"). The controller 213 coordinates the storage of these address elements in the memory 215, which is accessed by the quality score generator 203. The quality score generator 203 generates a list of candidate addresses from the address database 105 based on these elements, and assesses the quality of the candidate addresses in a manner to be described below with reference to FIGS. 3, 4, and 6-11. Accordingly, a quality score (QS) of the string and/or position of the candidate address elements is determined. For each candidate address, these quality scores are weighted by a factor stored in quality factor assignment module 201, and the weighted quality scores are summed by the quality score generator 203 to generate an overall quality score (OQS) for each candidate address.

Figure 3:
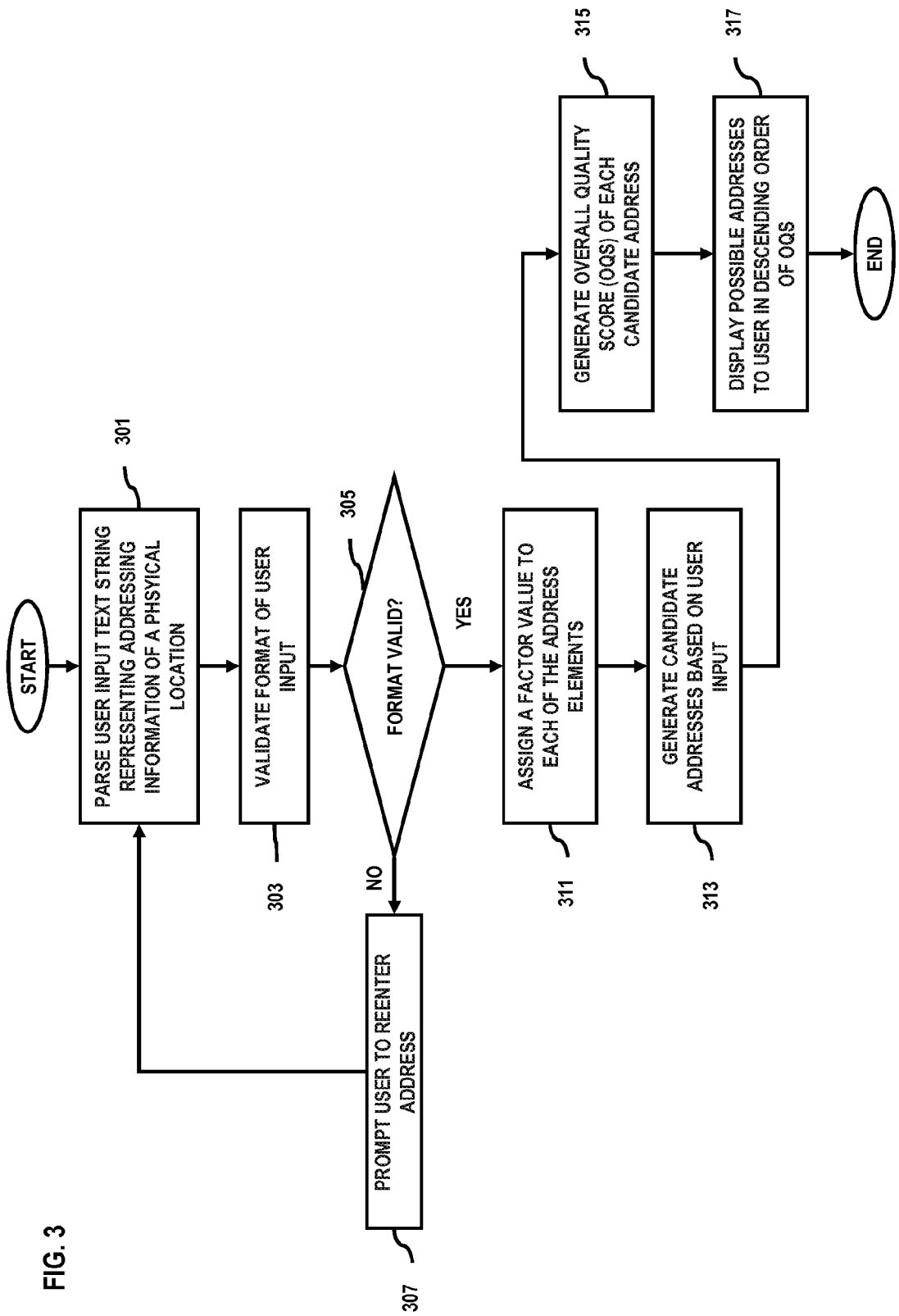
FIG. 3 is a flowchart of a process for providing an end user with a ranked listing of possible candidate physical addresses based on a user input physical address, according to an exemplary embodiment.

FIG. 3 is a flowchart of a process for providing an end user with a ranked listing of possible candidate physical addresses based on a user input physical address, according to an exemplary embodiment. In this example, a user device (e.g., mobile device 101a) inputs address information using any number of input methods—such as a keyboard, touch screen, voice recognition program, etc. The address information, in certain embodiments, can be supplied as a text string. The address information is transmitted to address evaluation platform 103. In step 301, the user input text is parsed; the user input text that represents addressing information of a physical location. An example of such text is: "104 Phldelphia Bells Mill Doad Rd." Address elements or fields are thereby generated (or otherwise determined) from the parsed text string. Typical address elements can include the following: Street Name, House Number, City, State, Zip, as well as other fields relating to addresses.

Next, in step 303, the format of the user input is validated by checking whether the generated address elements include all of the elements required for a valid address. An exemplary standard address format is: "[House Number] [Prefix] [Street] [Type] [Suffix] [Sub Type] [Sub Value] [City] [State] [Zip]". In step 305, if the format is not valid, the process prompts the user to reenter the address, as in step 307. Subsequently, the process repeats steps 301-305.

Returning to step 305, if the format of the input text string is valid, a factor value (weight) is assigned to at least one attribute of the address elements, per step 311. As will be described below, the factor value may be assigned to different attributes of the same address element. For example, separate factor values for the address element "Street Name" may be assigned to the content of the "Street Name" and the location of the street name.

In step 313, candidate addresses are generated based on the user provided address. In one embodiment, this generation involves searching the address database 105 and obtaining exact and/or "close" matches. The degree of matching can be predetermined through the use of thresholds, or other criterion.

In step 315, an overall quality score (OQS) for each candidate address is generated by applying the element factor values to the quality score (QS) associated with attributes of individual elements of, for example, both a candidate address and the user input address. As previously mentioned, attributes of an address element can include the string quality of that element and/or the position quality of that element. The string quality is assessed by comparing a string with the user input string. For example, if the address element is "Street Name" and the street name string of a candidate address is "Doheny", the string "Doheny" may be compared with the user input street name string "Dohene." In step 317, the candidate addresses are displayed on a screen of an end user device 101 in descending order of OQS.

The generation of the QQS, according to one embodiment, is now described.

Figure 4:
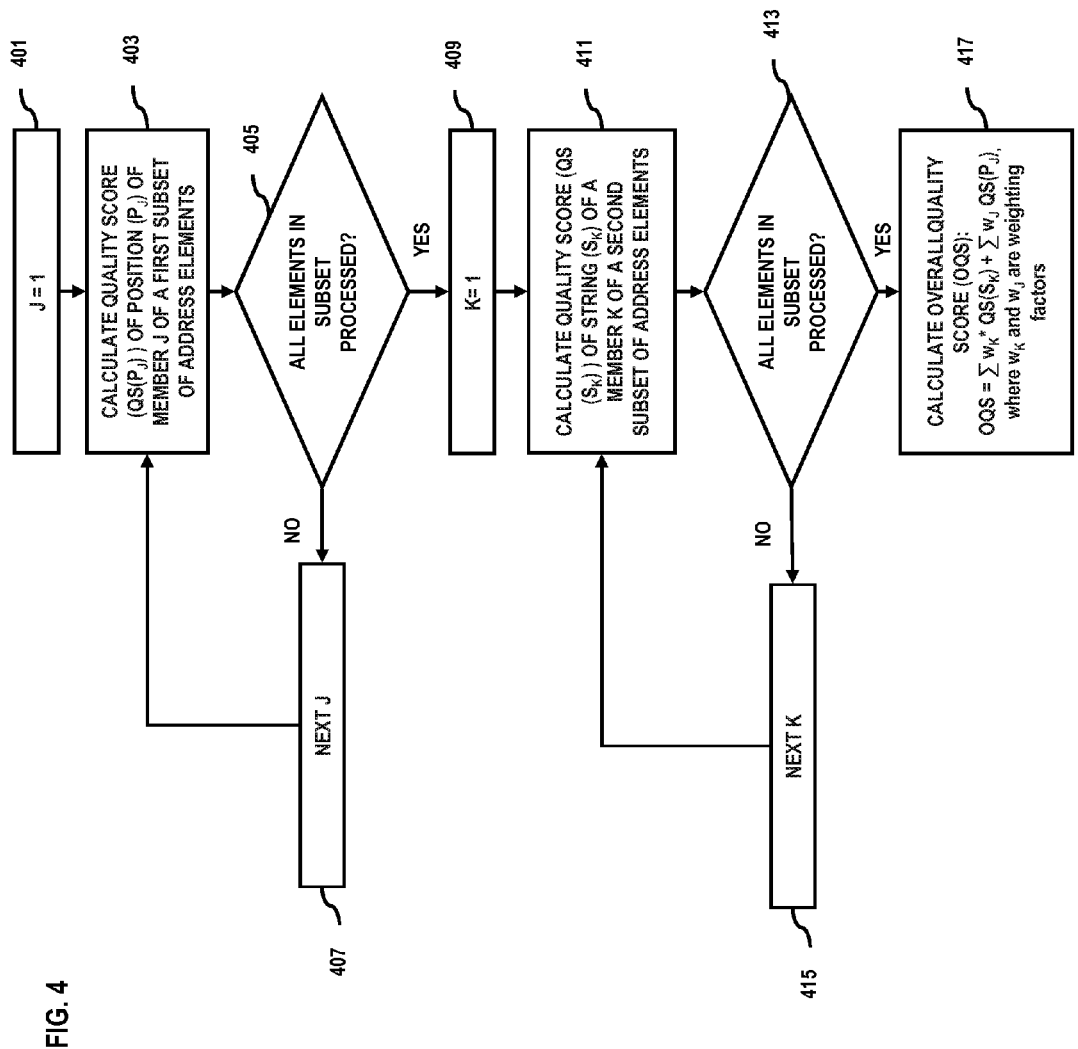
FIG. 4 is a flowchart of a process for generating an overall quality score for each candidate address based on quality scores associated with attributes of address elements, according to an exemplary embodiment.

FIG. 4 is a flowchart of a process for generating the OQS for each candidate address, according to an exemplary embodiment. This process involves calculating individual quality scores (QS) of both the position of a first subset of address elements and the string quality of a second subset of address elements.

In step 401, a counter J is set equal to the one. In step 403, the QS of the position of member J of the first subset is calculated in a manner that will be described with reference to FIGS. 8-10. This quality score is denoted by $QS(P_J)$. In step 405, the process determines whether all members of the first subset have been processed; if not, J is incremented, as in step 407.

In step 409, another counter, K, is initialized (e.g., set equal to the one). In step 411, the QS of the string of member K of the second subset is calculated in a manner that will be described with reference to FIGS. 6 and 7. This quality score is denoted by $QS(S_K)$. In step 413, the process checks whether all members of the second subset have been processed. If all the members have not been processed, K is incremented, as in step 415. If all members of the second subset have been processed, the OQS is computed by forming a weighted sum of both the position and string quality scores, $QS(P_J)$ and $QS(S_K)$ respectively (step 417). The weights, in one embodiment, are shown in FIG. 5.

Table 500 of FIG. 5 shows address elements 501, address element attributes 503 and weights 505 that are assigned to attributes in connection with generating an overall quality score. According to one embodiment, the first and second subsets of address elements overlap. For example, the address elements "Street Name" and "City Name" are within both the first and second subsets. The attribute information can specify position or string. A QS is calculated for each attribute, and the first and second subsets correspond to the Position ($P_i$) and String ($S_i$) attributes, respectively.

Figure 6:
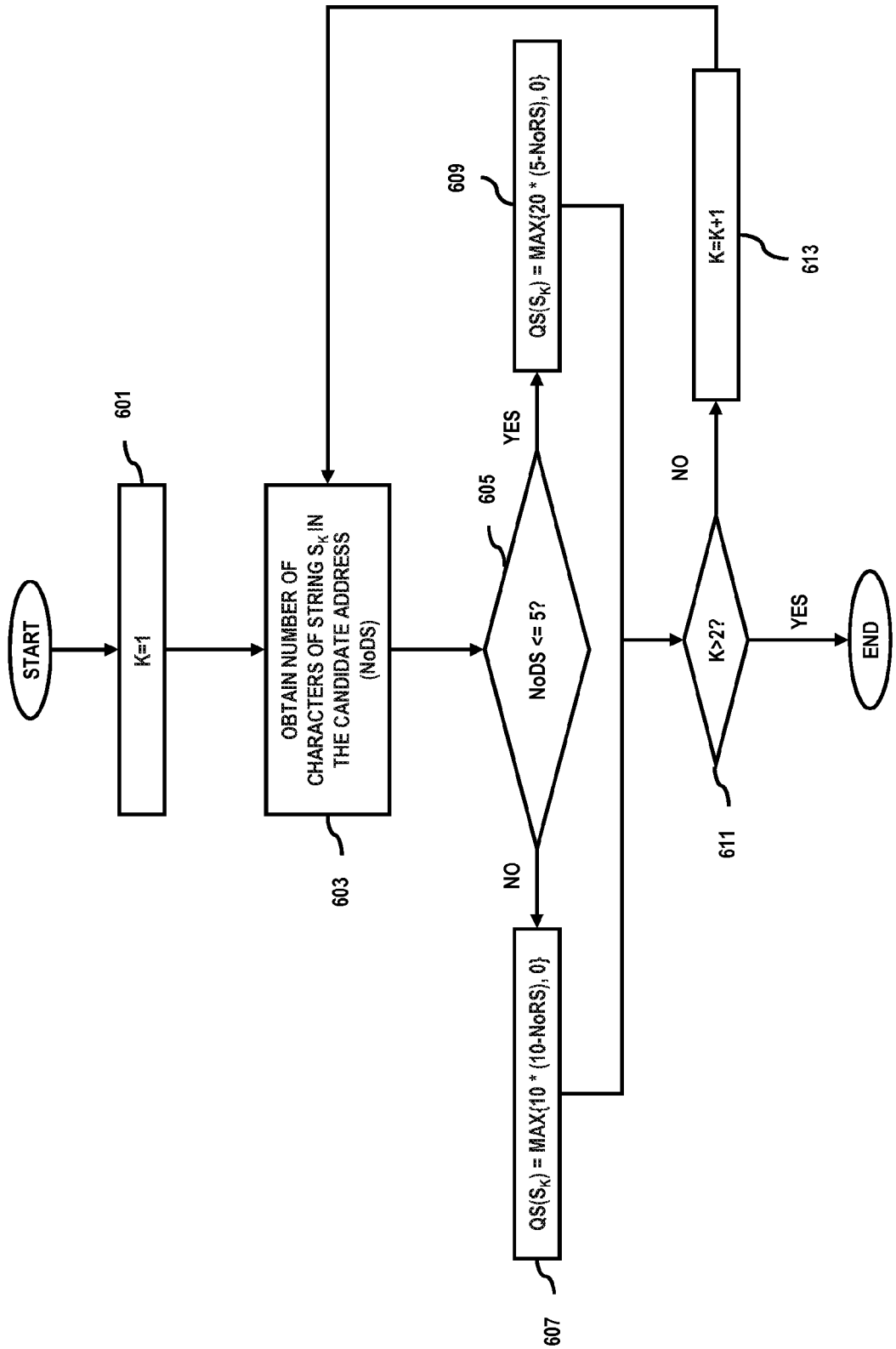
FIGS. 6-11 are flowcharts of processes for generating a string quality score for certain address elements, according to various embodiments.

FIG. 6 is a flowchart of a process for generating the string QS for certain address elements, "Street Name" and "City Name," according to an exemplary embodiment. In step 601, counter K is set equal to the one. In step 603, the process then determines the number of characters (NoDS) associated with string $S_K$ in the candidate address. For example, when K=1, the number of characters associated with the "Street Name" string is checked. Next, the process, per step 605, determines whether NoDS is less than or equal to a predetermined value, e.g., five; if so, a QS is assigned, as in step 607. If NoDS is not less than or equal to five, the QS is set based on the number of characters (NoRS) that need to be replaced in the string $S_K$ of the user input address to render it equal to the candidate string address. For example, if the address element is "Street Name" and the street name string of an address candidate is "Drake", and the user input "Street Name" string is "Droke," NoRS is 1. In step 609, $QS(S_K)$ is equal to 20*(5−NoRS) or 0, whichever is greater. Analogously, in step 607, $QS(S_K)$ is equal to 10*(10−NoRS) or 0, whichever is greater.

In step 611, the process determines whether K is greater than 2, in which case all of the pertinent address element strings (i.e., both "Street Name" and "City Name") have been processed. Otherwise, the next address element string ("City Name") is processed by incrementing K in step 613 and returning to step 603.

Figure 7:
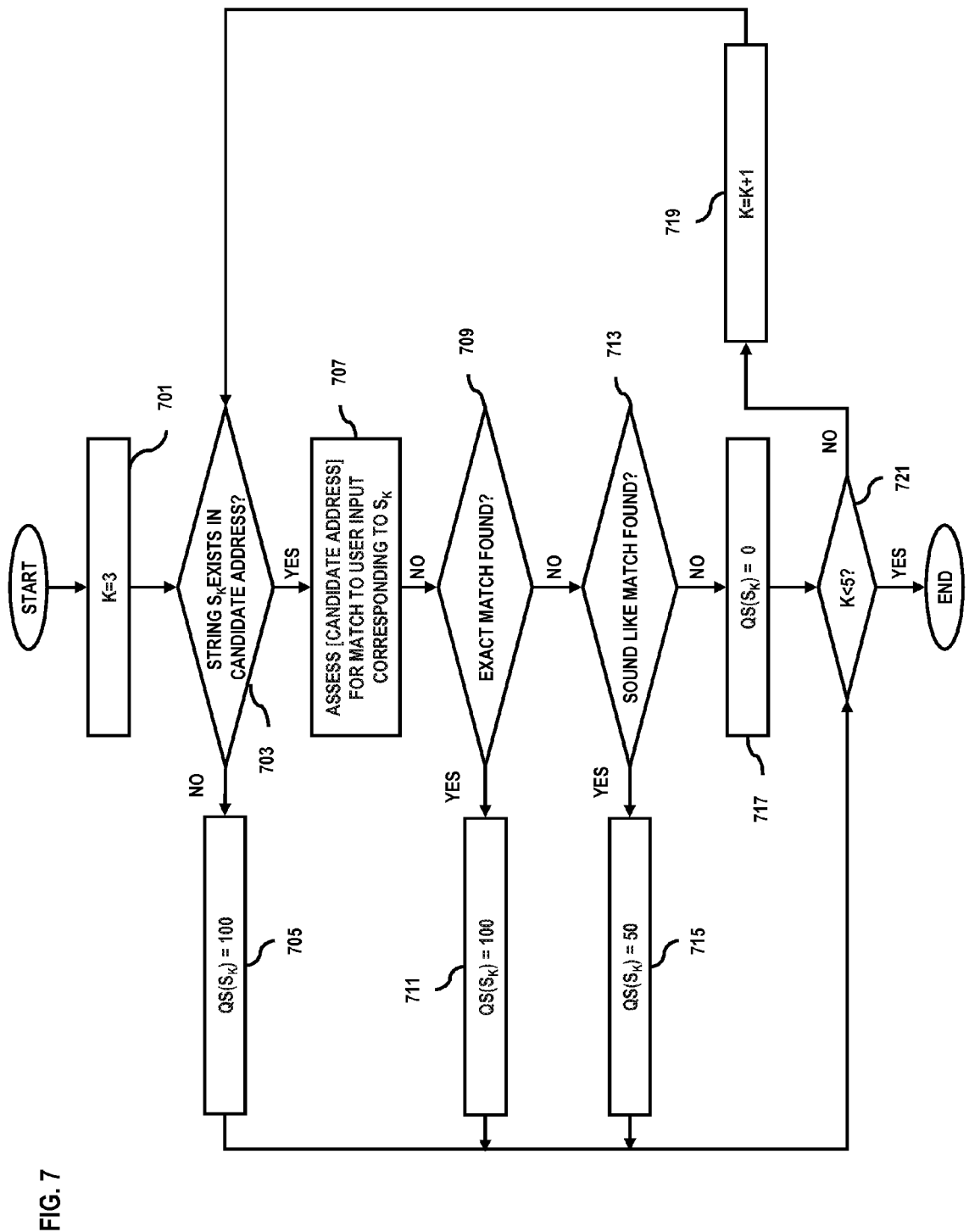

FIG. 7 is a flowchart of a process for generating the string QS for certain address elements, "Street Prefix", "Street Type" and "Street Suffix," according to an exemplary embodiment. In step 701, a counter K is set equal to the value three so that "Street Suffix" is the first string address element processed (coinciding with the attribute 503 of FIG. 5). Next, the process, as in step 703, determines whether string $S_K$ exists in a candidate address string, the user input address, or both. For example, if the string $S_K$ is "Street Prefix," the process, per step 703, determines whether there is a "Street Prefix" in the candidate address. If no such string is associated with the candidate address, then the process, as in step 705, assigns a QS of 100 to $S_K$, i.e., $QS(S_K)$=100 for the candidate address being processed.

Otherwise, in step 707, the process attempts to match the candidate string element $S_K$ with the user input address element corresponding to $S_K$. Continuing with the above example, if the string $S_K$ is "Street Prefix," the process attempts to match the "Street Prefix" of the candidate string with the "Street Prefix" of the user input address. The process, as in step 709, determines whether an exact match exists. If so, then the process, per step 711, assigns a QS of 100 to $S_K$, i.e., $QS(S_K)$=100. If the match is not exact, then the process, as in step 713, determines whether a sound like match is found. If so, in step 715 the process assigns a QS of 50 to the candidate address $S_K$, i.e., $QS(S_K)$=50 for the candidate address being processed. If no sound like match is found, then the process, per step 721, assigns a QS of 0 to $S_K$, i.e., $QS(S_K)$=0.

In step 721, a determination is made whether all pertinent address elements have been processed. Specifically, if K is less than 5, then additional address elements remain to be processed and K is incremented in step 719.

Figure 8:
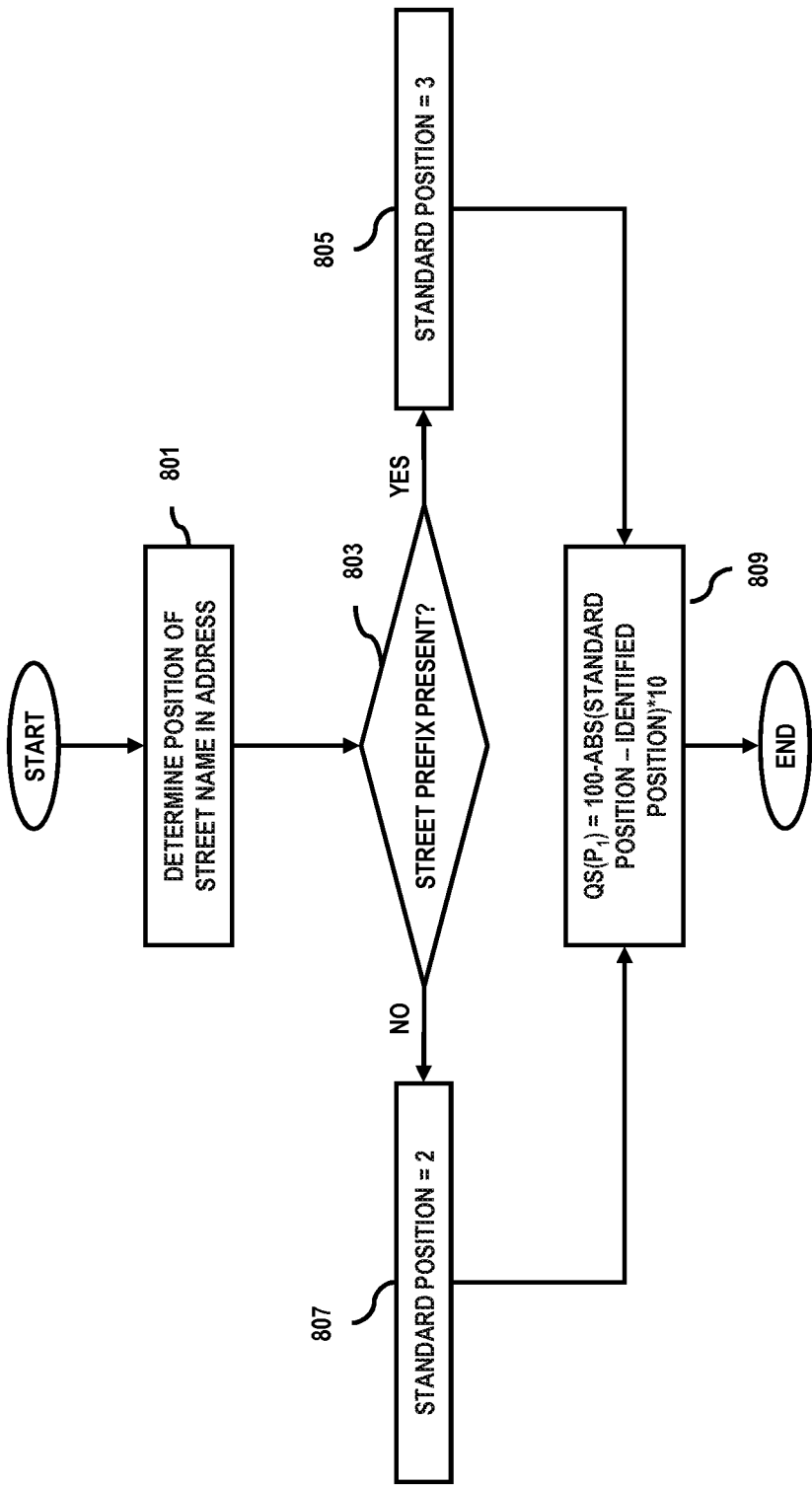

FIG. 8 is a flowchart of a process for generating the QS for "Street Name" position, according to an exemplary embodiment. In step 801, the position of the street name in the user input address is determined, e.g., counting left to right. For example, for the street substring "123 Elm Lane", the street name "Elm" is in position 2. In step 803, the process determines whether a street prefix is present. If so, in step 805, the standard position of the street name is set equal to 3 when the standard address format is "[House Number] [Prefix] [Street] [Type] [Suffix] [Sub Type] [Sub Value] [City] [State] [Zip]". If no street prefix is present, then the process, per step 807, assigns a value of 2 to the standard position since [Street] is in the $2^{nd}$ position in the standard format if no [Prefix] is present.

In step 809, the QS of the "Street Name" position is 100-ABS(standard position-identified position)*10, where "ABS" indicates the absolute value operation.

Figure 9:
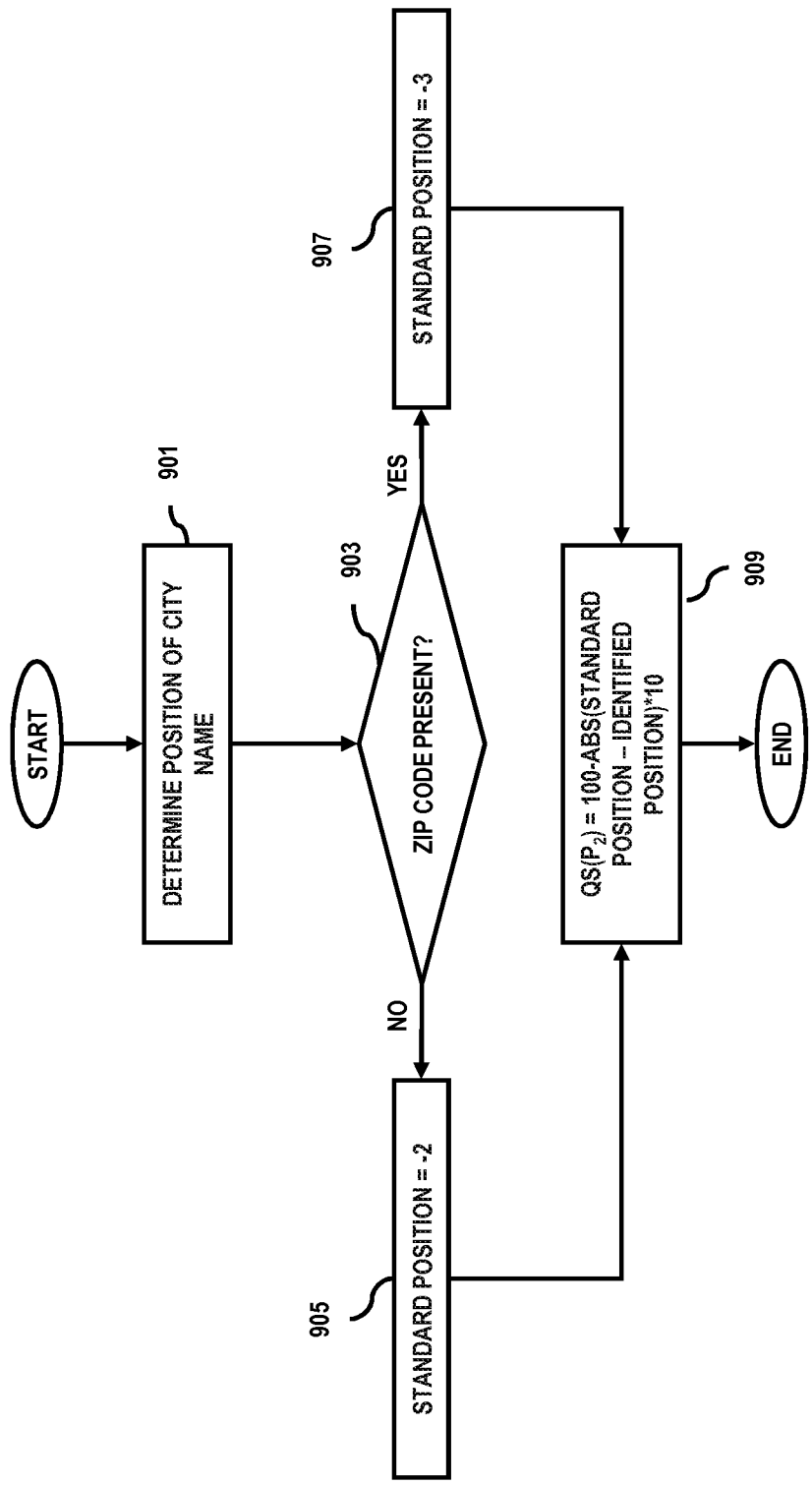

FIG. 9 is a flowchart of a process for generating the QS for "City Name" position, according to an exemplary embodiment. In step 901, the position of the city name in the user input address is determined (e.g., counting right to left). In step 903, the process determines whether a Zip code is present. If so, in step 907, the standard position of the city name is −3 when the standard address format is "[House Number] [Prefix] [Street] [Type] [Suffix] [Sub Type] [Sub Value] [City] [State] [Zip]". If no zip code is present, then step 905 assigns a value of −2 to the standard position since [City] is in the $2^{nd}$ position from the right in the standard format if no [Zip] is present.

In step 909, the QS of the "City Name" position is 100-ABS(standard position-identified position)*10, where "ABS" indicates the absolute value operation.

Figure 10:
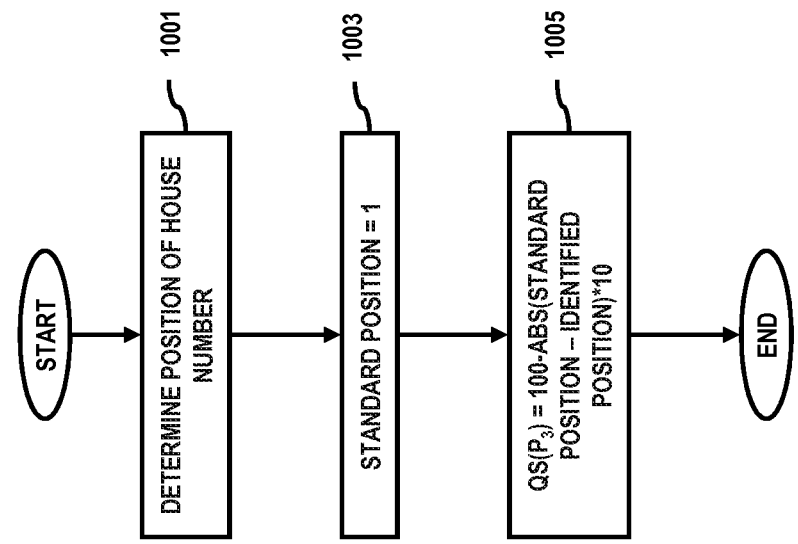

FIG. 10 is a flowchart of a process for generating the QS for "House Number" position, according to an exemplary embodiment. In step 1001, the position of the House Number in the user input address is determined. In step 1003, the standard position of 1 is assigned to "House Number." In step 1005, the QS of the "House Number" position is 100-ABS (standard position-identified position)*10, where "ABS" indicates the absolute value operation.

Figure 11:
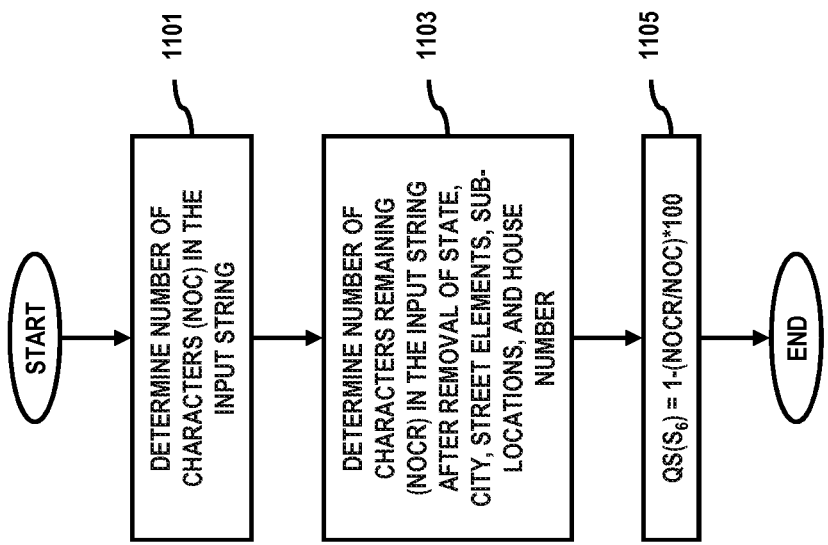

FIG. 11 is a flowchart of a process for generating the QS for the raw string input by the user, according to an exemplary embodiment. In step 1101, the number of characters (NOC) in the input string is determined. In step 1103, the address evaluation platform 103 determines the number of characters remaining (NOCR) in the input string after removing state, city, street, sub-locations and house number. In step 1105, the QS of input string is set equal to 1−(NOCR/NOC)*100.

Figure 12:
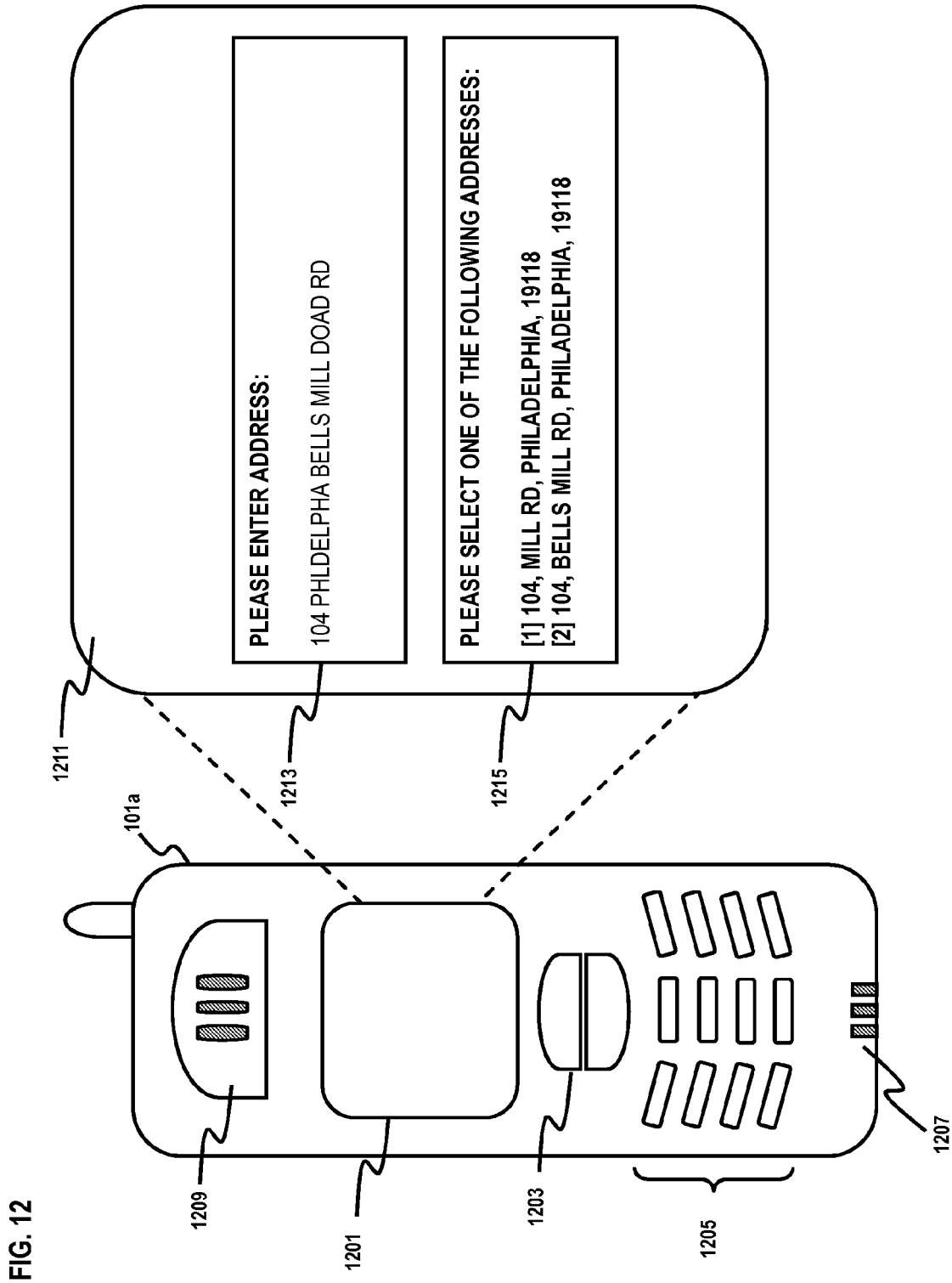
FIG. 12 is a diagram of a mobile device configured to acquire address information from an end user and to assess the quality of the information, according to one embodiment.

FIG. 12 is a diagram of a mobile device configured to acquire addresses from an end user and to display ranked candidate address to the end user, according to one embodiment. Mobile device 101*a* (see FIG. 1) includes a display 1201, keypads 1203 and 1205, microphones 1207, and/or speakers 1209. Display 1201 provides a graphical user interface (GUI) 1211 that permits a user of mobile device 101*a* to view dialed digits, call status, menu options, and other service information. The GUI 1211 may include icons and menus, as well as other text and symbols. Keypads 1203 and 1205 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 1207 coverts spoken utterances of a user (or other auditory sounds, e.g., environmental sounds) into electronic audio signals, whereas speaker 1209 converts audio signals into audible sounds.

An exemplary address input and display session under control of the GUI 1211 is diagrammatically shown in the right side of the figure. In panel 1213, the user is prompted to enter an address. The user responds by entering an address through keypads 1203 and/or 1205, or by speaking the address into the microphone 1207, in which case voice recognition processes within the mobile device 101*a* translate the speech into text. In any event, the address input by the user is displayed in panel 1213. The address is sent to the address evaluation platform 103 through the wireless network 111 and the service provider network 115 (see FIG. 1). The address evaluation platform 103 generates a ranked list of candidate addresses in the manner described above, and this list is transmitted to the mobile device 101*a* through the service provider network 115, wireless network 111. The mobile device 101*a* then displays the ranked list on display 1201 under the control of GUI 1211.

The ranked list of candidate addresses is shown in panel 1215. The user may select an address through the use of the keypads 1203 and/or 1205, or by speaking into the microphone 1207, in which case speech recognition processes translate the verbal selection into digital data.

The above processes for determining quality of address information can readily be applied, in one embodiment, to a customer support service, as next described.

Figure 13:
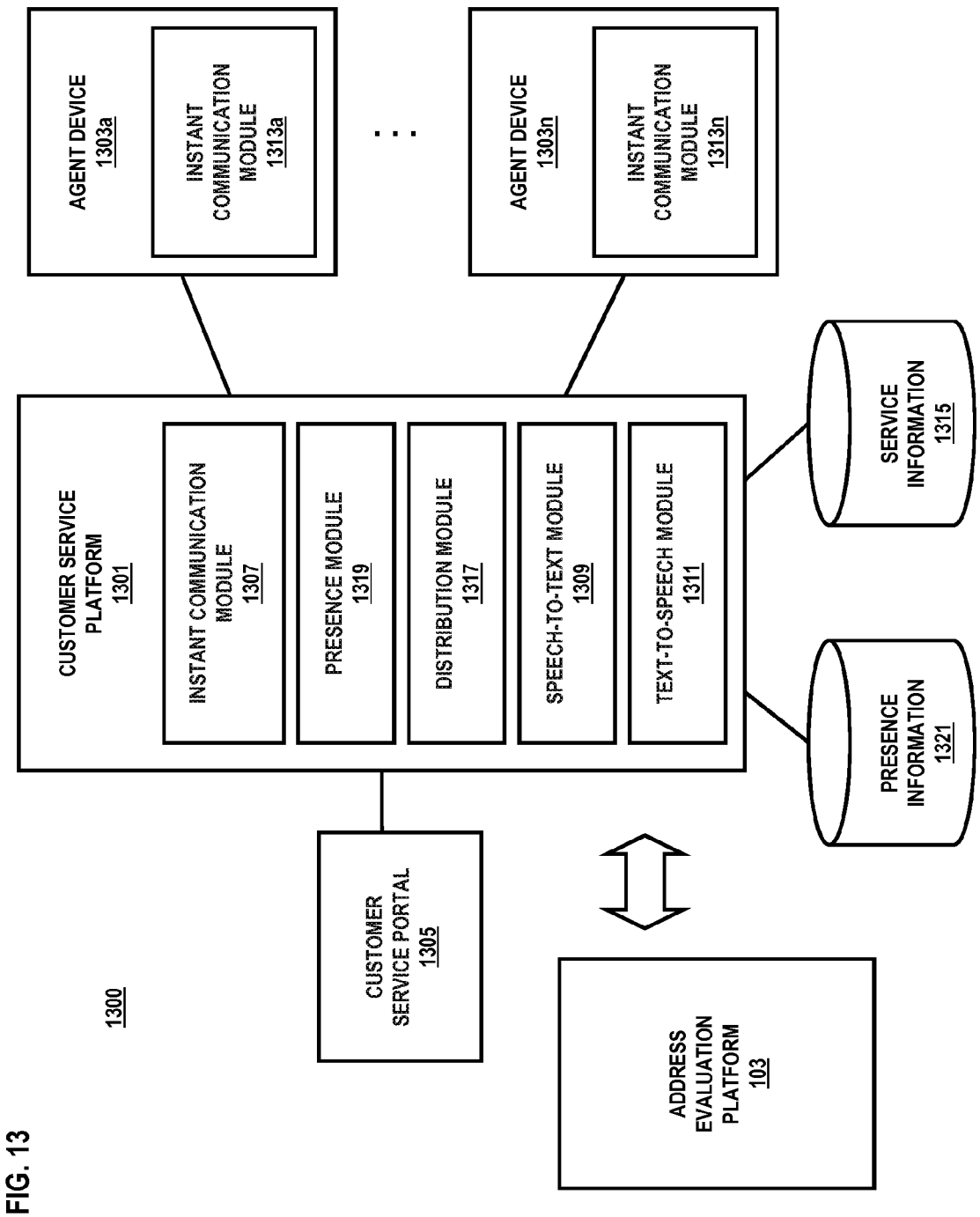
FIG. 13 is a diagram of a customer support system capable of utilizing ranked address information, according to one embodiment.

FIG. 13 is a diagram of a customer support system capable of utilizing ranked address information, according to one embodiment. For the purpose of illustration, system 1300 is described with respect to customer service platform (or platform) 1301 in which customers may request assistance via one or more instant communication (or chat)-based sessions from one or more customer service agents (or agents), at one or more agent devices 1303*a*-1303*n*. Under this scenario, the support service may involve the submission of an address by the users (customers) in connection with an electronic transaction. The quality of the address information can thus be assessed by address evaluation platform 103. It is noted that customer service platform 1301 may distribute the one or more instant communication sessions to the one or more agents based on, for example, presence information associated with the agents. To this end, platform 1301 is configured to facilitate the one or more instant communication-based sessions over one or more communication networks (e.g., networks 111, 113, 115, 117 of FIG. 1). In exemplary embodiments, platform 1301 is further configured to support speech-to-text and/or text-to-speech conversion and, thereby, configured to seamlessly integrate and toggle between speech-based and chat-based communication so that participants can communicate using one or more of speech-based and chat-based technologies. Once the address information is supplied over the instant communication-based session in the course of the customer service communication, the text string is provided to address evaluation platform 103.

According to one embodiment, a customer service portal 1305 is provided for a user (e.g., customer) to interface with the customer service platform 1301; such portal 1305 can be in form of a website accessible via a browser application, for instance. The end user enters an address through the customer service portal 1305 and receives a ranked listing of candidate addresses through the customer service portal 1305.

Platform 1301 may also enable participants to exchange (e.g., upload, download, transfer, etc.) information, such as data files (e.g., audio, image, text, and/or video) via the one or more instant communication sessions, as well as store one or more records of data (e.g., correspondence, exchanged information, etc.) between participants of the one or more instant communication sessions. The one or more records may be time stamped, tracked, received, retrieved, and the like. As such, user devices and agent devices 1303*a*-1303*n* may be equipped with respective instant communication modules 1307*a*-1307*n* for executing one or more instant communication, messaging, or chat-based applications (or clients) for corresponding via established instant communication based customer support sessions. While specific reference will be made hereto, it is contemplated that system 1300 may embody many forms and include multiple and/or alternative components and facilities.

According to exemplary embodiments, customer service platform 1301 (via, for example, instant communication module 1307) is configured to establish and/or support one or more instant communication-based sessions between one or more users (or customers) and one or more customer service agents (or agents) for providing customers and enterprises alike with managed instant communication-based customer support services. In this manner, instant communication module 1307 is configured to process data communications, such as text messages, between endpoints of system 1300, such as user devices and agent devices 1303a-1303n. With the aid of speech-to-text module 1309 and text-to-speech module 1311, instant communication session module 1303 may further convert between speech-based and chat-based modes of communication, as well as enable participants (e.g., agents) to review and modify communications before transmitting them to the correspondingly other participants (e.g., customers). Thus, in exemplary embodiments, speech-to-text module 1309 and text-to-speech module 1311 may capture corresponding voice and/or text correspondence so that converted correspondences may be presented (e.g., displayed) in one or more instant communication-based sessions. For example, when an agent via, for instance, agent device 1303a provides one or more utterances as input to instant communication module 1307a, the speech may be converted to text data, such that the text data may displayed to participants of the chat-based customer support session as text data. In other instances, an agent via, for instance, agent device 1303n may provide one or more textual inputs to instant communication module 1307, such that input text data is converted to speech correspondence by, for example, text-to-speech module 1311 and, thereby, presented to a corresponding customer at, for instance, a user device that, in this example, has telephony capabilities.

In various exemplary embodiments, instant communication module 1307, as well as instant communication modules 1313a-1313n, may employ one or more instant communication (or chat) client protocols, such as an extensible messaging and presence protocol (XMPP), a session initiating protocol (SIP), a session initiation protocol for instant messaging and presence leveraging extensions (SIMPLE), and/or any other suitable protocol, for establishing, maintaining, and/or supporting corresponding channels for instant communication based customer support sessions.

To enhance user and agent experiences, instant communication module 1307 may also facilitate the exchange (e.g., uploading, downloading, modifying, customizing, etc.) of various forms of customer support (or service) information. For example, instant communication module 1307 may provide one or more graphical user interfaces (GUI) to enable participants at user devices and agent devices 1303a-1303n to access, input, update, and/or maintain one or more user profiles that specify, for example, information corresponding to buddy names, passwords, internet protocol addresses, electronic mail addresses, geographical assignments, schedules (start time, stop time, breaks, etc.), skills, technological capabilities, etc. This "user profile" information may be stored to service information repository 1315 or any other suitable storage location or memory of (or accessible to) system 1300. It is contemplated, however, that the features or functionalities of instant communication module 1307 may be shared and/or distributed among corresponding instant communication modules 1313a-1313n associated with respective user devices and agent devices 1303a-1303n.

According to various exemplary embodiments, established instant communication based customer support sessions may be distributed by platform 1301 (via, for example, distribution module 1317) to one or more customer support agents at, for example, one or more agent devices 1303a-1303n. Distribution of these instant communication-based sessions may be based on, for example, presence information associated with the agents. As such, platform 1301 may also include (or have access to) presence module 1319 and/or presence information repository 1321 for determining availabilities of a plurality of agents based on, for example, presence information associated with the plurality of agents. In exemplary embodiments, presence module 1319 may be configured to generate and/or collect presence information from participants, as well as store such presence information at presence information repository 1321 or any other suitable storage location or memory of (or available to) system 1300.

Presence information may related to one or more parameters, such as one or more geographies, customer support issues being "currently" addressed, workload rotations (e.g., schedule for distributing instant communication sessions to agents in one or more predefined patterns, etc.), schedules (start time, stop time, breaks, etc.), skills, technological capabilities of corresponding agent devices, and general workload (e.g., past, present, and/or future), as well as any other suitable presence parameter. It is noted that one or more of these forms of presence information may be defined as "rich" presence information, which is an enhanced form of presence awareness in which participants can determine if other users are online and if so, observe to a limited extent what activities the participants are engaged in and how they are performing the activities. Basic presence services divulge only the availability of another user. By contrast, rich presence provides greater information, whereby users can let others know any other suitable form of information beyond conventional presence information. An exemplary model for presence and presence determination are respectively detailed in Internet Engineering Task Force (IETF) Request for Comments (RFC) 2778 and 2779, which are incorporated herein, by reference, in their entireties. An exemplary data format for conveying presence information, as well as extensions to that format for conveying rich presence information, are respectively detailed in IETF RFCs 3863 and 4480, which are incorporated herein, by reference, in their entireties.

Accordingly, presence information may be retrieved or ported to distribution module 1317 for determining availabilities and, thus, utilizing those availabilities for distributing established instant communication sessions to appropriate customer service agents. Because of the immediate or instant nature of the communication, instant communication module 1307 may also utilize presence information or availability of participants for facilitating the exchange of information over "active" instant communication sessions. Thus, user devices, via instant communication modules and agent devices 1303a-1303n, via instant communication modules 1313a-1313n, and/or one or more contact (or "buddy") lists, may transmit and view presence information (e.g., presence messages) over one or more of communication networks to indicate and perceive one or more availability states (e.g., online, away, etc.) of user devices and/or agent devices 1303a-1303n and, thereby, of the participants.

Platform 1301, via instant communication session module 1307, may also enable customers and agents to exchange (e.g., upload, download, customize, etc.) information, such as data files (e.g., audio data, image data, text data, and/or video data) via instant communication based sessions, as well as monitor and store a record of data transmitted during an instant communication session. Records may be stored to, for example, service information repository 1315. These records may be tracked, time stamped, retrieved, and/or utilized to facilitate queries for such records or customer support issues resolved within such records. It is contemplated that service information may further include one or more help files, customer support navigation trees, batched responses to recurring customer issues, prompts, customer support knowledge base files (or links thereto), and/or any other equivalent, suitable, and/or conventional customer support information. Again, these various forms of service information may be stored to service information repository 1315 or any other suitable storage location or memory of (or accessible to) system 1300.

It is noted that user devices and agent devices 1303a-1303n may include one or more components for extending instant communications sessions to participants, as well as include one or more components for enabling speech input and/or output. In this manner, devices and 1303a-1303n include respective instant communication modules and 1313a-1313n and/or any other suitable client programs that operate thereon for providing access to the various services of system 1300, such as providing access to the managed instant communication based customer support services of platform 1301. As previously mentioned, it is contemplated that instant communication modules 1313a-1313n (or the other client programs) may be executed via platform 1301 (e.g., via instant communication module 1307) and, thereby, made accessible to participants via devices 1303a-1303n. In this way, instant communication modules 1313a-1313n may provide one or more user interfaces, e.g., graphical user interfaces (GUI), configured to interact with the various services (or functions) of system 1300. Additionally (or alternatively), GUI interfaces may be configured to facilitate the acquisitioning, exchanging, managing, sharing, storing, and updating of service information stored to, for example, service information repository 1321.

It is further noted that repositories 1315 and 1321 may be maintained by a service provider of platform 1301 or by any suitable third-party. It is also contemplated that the physical implementation of repositories 1315 and 1321 may take on many forms, including, for example, portions of existing repositories of a service provider, new repositories of a service provider, third-party repositories, and/or shared-repositories. As such, repositories 1315 and 1321 may be configured for communication over system 1300 through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repositories 1315 and 1321 is provided in a distributed fashion, information and content available via repositories 1315 and 1321 may be located utilizing any suitable querying technique, such as electronic number matching, distributed universal number discovery (DUNDi), uniform resource identifiers (URI), etc.

The processes described herein for assessing the quality of address information for physical locations may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
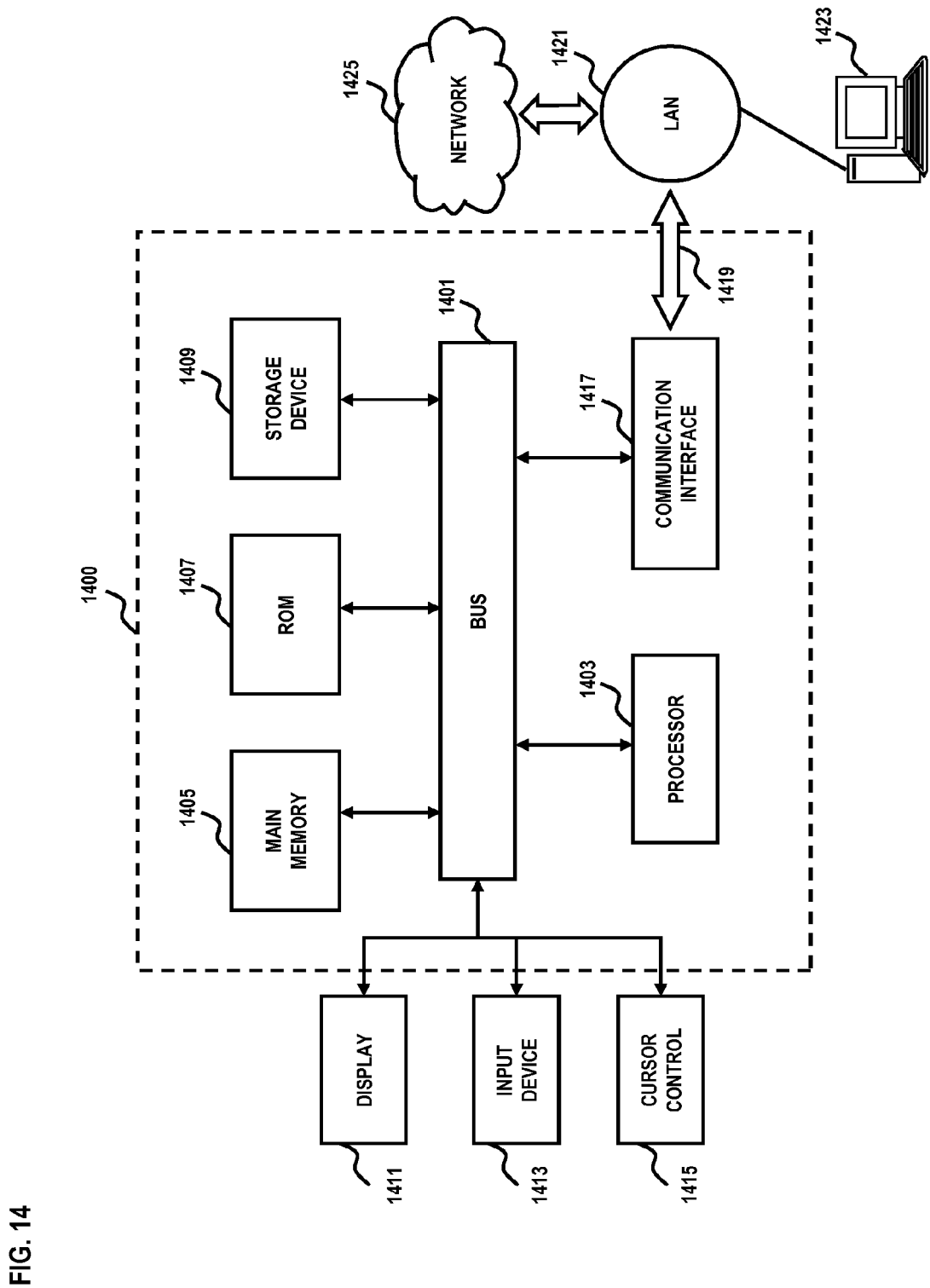
FIG. 14 illustrates computing hardware (e.g., computer system) upon which an embodiment according to the invention can be implemented.

FIG. 14 illustrates computing hardware (e.g., computer system) upon which an embodiment according to the invention can be implemented. The computer system 1400 includes a bus 1401 or other communication mechanism for communicating information and one or more processors (of which one is shown) 1403 coupled to the bus 1401 for processing information. The computer system 1400 also includes main memory 1405, such as a random access memory (RAM) or other dynamic storage device, coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a cathode ray tube (CRT), liquid crystal display, active matrix display, or plasma display, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for adjusting cursor movement on the display 1411.

According to an embodiment of the invention, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement the embodiment of the invention. Thus, embodiments of the invention are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, a telephone modem, or any other communication interface to provide a data communication connection to a corresponding type of communication line. As another example, communication interface 1417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a PCMCIA (Personal Computer Memory Card International Association)

interface, etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 (e.g. a wide area network (WAN) or the global packet data communication network now commonly referred to as the "Internet") or to data equipment operated by a service provider. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an embodiment of the invention through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1409. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 15:
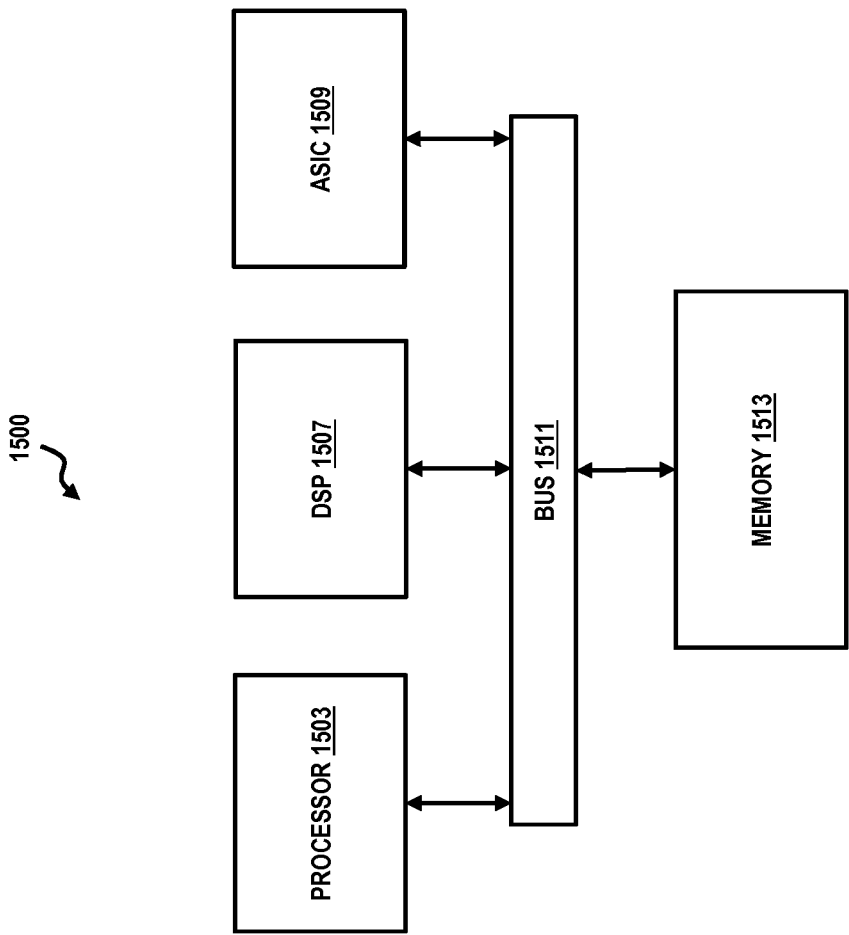
FIG. 15 illustrates a chip set upon which an embodiment of the invention may be implemented.

FIG. 15 illustrates a chip set 1500 upon which an embodiment of the invention may be implemented. Chip set 1500 is programmed to acquire an address from a user and to display ranked candidate addresses to the user, as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of FIGS. 3, 4, and 6-11.

In one embodiment, the chip set 1500 includes a communication mechanism such as a bus 1511 for passing information among the components of the chip set 1500. A processor 1503 has connectivity to the bus 1511 to execute instructions and process information stored in, for example, a memory 1513. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1511 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1513 via the bus 1511. The memory 1513 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1513 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   parsing a text string representing addressing information of a physical location;

generating a plurality of address elements based on the parsed text string;
assigning a factor value to each of the address elements;
determining a plurality of candidate addresses based on the parsed text string; and
computing a quality score for each of the candidate addresses to assist with selection of one of the candidate addresses
wherein each corresponding quality score is computed using the assigned factor values.

2. A method according to claim 1, further comprising:
determining number of characters of the text string excluded from the address elements; and
assigning a factor value for the excluded text string for use in computing the quality score.

3. A method according to claim 1, wherein the address elements include a street name, a street prefix, a street type, a street suffix, a city name, a house number, or a combination thereof.

4. A method according to claim 3, further comprising:
assigning a factor value relating to position of the address element within the text string for use in computing the quality score.

5. A method according to claim 1, further comprising:
receiving the text string from a user device over a communication network;
generating a list of the candidate addresses according to the quality scores; and
initiating transmission of the list over the network to the user device for presentation of the list for the selection.

6. An apparatus comprising:
at least one processor; and
at least one memory including computer program code, the at least one memory and the computer program code being configured to, with the at least one processor, cause the apparatus at least to:
parse a text string representing addressing information of a physical location,
generate a plurality of address elements based on the parsed text string,
assign a factor value to each of the address elements,
determine a plurality of candidate addresses based on the parsed text string, and
compute a quality score for each of the candidate addresses to assist with selection of one of the candidate addresses,
wherein each corresponding quality score is computed using the assigned factor values.

7. An apparatus according to claim 6, wherein the apparatus is further caused to:
determine number of characters of the text string excluded from the address elements; and
assign a factor value for the excluded text string for use in computing the quality score.

8. An apparatus according to claim 6, wherein the address elements include a street name, a street prefix, a street type, a street suffix, a city name, a house number, or a combination thereof.

9. An apparatus according to claim 8, wherein the apparatus is further caused to:
assign a factor value relating to position of the address element within the text string for use in computing the quality score.

10. An apparatus according to claim 6, wherein the apparatus is further caused to:
receive the text string from a user device over a communication network;
generate a list of the candidate addresses according to the quality scores; and
initiate transmission of the list over the network to the user device for presentation of the list for the selection.

11. A method comprising:
receiving a prompt for addressing information from an agent terminal;
generating a text string representing addressing information of a physical location;
initiating transmission of the text string to the agent terminal;
receiving a plurality of candidate addresses generated based on the text string, wherein the candidate addresses are arranged according to quality scores for the respective candidate addresses; and
presenting the arranged candidate addresses for selection of one of the candidate addresses,
wherein each of the quality scores are computed by:
parsing a text string representing addressing information of a physical location;
generating a plurality of address elements based on the parsed text string; and
assigning a factor value to each of the address elements, and
wherein each corresponding quality score is computed using the assigned factor values.

12. A method according to claim 11, wherein each of the quality scores are further computed by,
determining number of characters of the text string excluded from the address elements; and
assigning a factor value for the excluded text string for use in computing the quality score.

13. A method according to claim 11, wherein the address elements include a street name, a street prefix, a street type, a street suffix, a city name, a house number, or a combination thereof.

14. A method according to claim 13, wherein each of the quality scores are further computed by assigning a factor value relating to position of the address element within the text string for use in computing the quality score.

15. An apparatus comprising:
at least one processor; and
at least one memory including computer program code, the at least one memory and the computer program code being configured to, with the at least one processor, cause the apparatus at least to:
receive a prompt for addressing information from an agent terminal,
generate a text string representing addressing information of a physical location,
initiate transmission of the text string to the agent terminal,
receive a plurality of candidate addresses generated based on the text string, wherein the candidate addresses are arranged according to quality scores for the respective candidate addresses, and
present the arranged candidate addresses for selection of one of the candidate addresses,
wherein each of the quality scores are computed by:
generating a plurality of address elements based on the parsed text string; and
assigning a factor value to each of the address elements,
wherein each corresponding quality score is computed using the assigned factor values.

16. An apparatus according to claim 15, wherein each of the quality scores are further computed by, determining number of characters of the text string excluded from the address elements; and assigning a factor value for the excluded text string for use in computing the quality score.

17. An apparatus according to claim 15, wherein the address elements include a street name, a street prefix, a street type, a street suffix, a city name, a house number, or a combination thereof.

18. An apparatus according to claim 17, wherein each of the quality scores are further computed by assigning a factor value relating to position of the address element within the text string for use in computing the quality score.

* * * * *